United States Patent Office
3,460,713
Patented Aug. 12, 1969

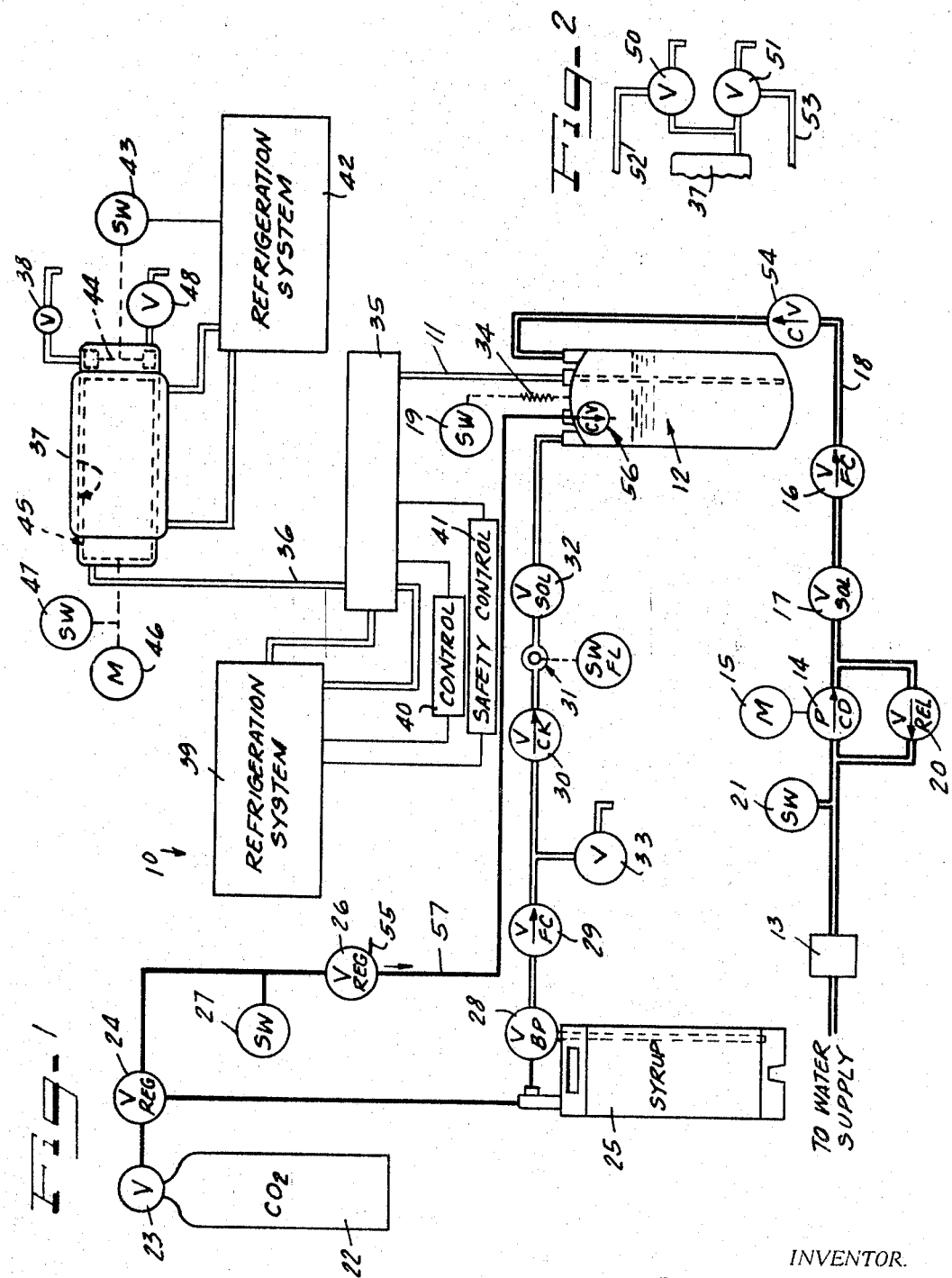

3,460,713
METHOD OF DISPENSING A REFRIGERATED BEVERAGE
Richard T. Cornelius, Minneapolis, Minn., assignor to The Cornelius Company, Anoka, Minn., a corporation of Minnesota
Filed Nov. 9, 1967, Ser. No. 681,717
Int. Cl. B67d 5/62, 5/56
U.S. Cl. 222—1     32 Claims

ABSTRACT OF THE DISCLOSURE

Water, syrup, and carbon dioxide gas are combined to form a carbonated beverage having a predetermined level of carbonation and predetermined level of sweetness, the resulting product being first refrigerated to a temperature near freezing, and then transferred to a freezing chamber where a selected percentage of the water in such beverage is frozen out as pure ice, thereby raising the sweetness and level of carbonation of the remaining liquid to a desired level, such desired level being controlled by sensing the viscosity of the resulting slush.

BACKGROUND OF THE INVENTION

Field of the invention

This invention relates to a method for producing and dispensing a carbonated slush-ice beverage.

Prior art

Heretofore, it has been known to take a carbonated beverage substantially at atmospheric pressure and to refrigerate it in a manner to form slush therein. With such a method, the carbonation is unstable and the beverage goes flat. Moreover, such method inherently involves open apparatus which is unacceptable under certain sanitation standards.

It has also been known to carbonate a beverage in a closed freezing chamber, under pressure, thereby simultaneously producing slush in such beverage. With such a system, the gas in the freezing chamber expands during withdrawing of product, and there is the tendency for it to splatter. Moreover, the level of carbonation is uncontrolled in the sense that such level will be dependent on several variables which will inherently vary to some degree.

Summary of the invention

In this invention a quantity of aqueous beverage having a fixed predetermined degree of carbonation is provided, the temperature thereof being lowered to form pure ice therein while under the supply pressure with no free carbon dioxide gas present. The amount of ice formed is closely regulated as a function of viscosity to thereby remove from the liquid portion of the beverage a certain percentage of the water whereby the remaining liquid portion is sweeter and contains a higher concentration of carbonic acid. During withdrawing of the finished slush-ice beverage for consumption, the pressure in the freezing chamber is close to atmospheric.

Accordingly, it is an object of the present invention to provide a slush-ice drink wherein the carbonation level is accurately controlled.

Another object of the present invention is to provide a method of preparing slush-ice beverage wherein the ice particle size is too small to be detected by chewing between teeth.

Another object of the present invention is to provide a slush-ice beverage having a relatively high level of carbonation in its fluid portion whereby the product identity established by the taste thereof is maintained.

Another object of the present invention is to provide a method and apparatus for making a slush-ice beverage having from 10 to over 50% of the water in solid phase.

A still further object of the present invention is to provide a slush-ice beverage of the carbonated type having such properties that there will be in the case of wet drinks a minimum of product expansion upon dispensing thereof, ideally less than 15% and not over 25%, such machine being also capable of producing a maximum of product expansion, ideally over 100% in the case of firm drinks.

A still further object of the present invention is the provision of a method and apparatus for producing a carbonated slush-ice beverage which will enable the dispensing of an ice and carbonated liquid mixture at a controlled constant rate of flow and of constant expansion, whereby the same may be employed in coin operated dispensers, such as of the automatic type.

A still further object of the present invention is to provide a method of and apparatus for preparing and dispensing a slush-ice beverage wherein there will be no break-out of carbon dioxide gas or gas collection in the freezing chamber so as to avoid factors such as sputtering, and increase of product flow-rate due to gas expansion.

Many other advantages, features and additional objects of the present invention will become manifest to those versed in the art upon making reference to the detailed description and the accompanying sheet of drawings in which a preferred structural embodiment incorporating the principles of the present invention is shown by way of illustrative example.

On the drawings:
FIG. 1 is a diagrammatic view of a system for preparing and dispensing a slush-ice beverage embodying the method steps of the present invention; and
FIG. 2 is a modified form of multi-flavor system.

As shown on the drawings:
The principles of the present invention are particularly useful when embodied in a slush-ice dispencing system such as shown in FIG. 1, generally indicated by the numeral 10. A sugar-containing beverage is to be produced and dispensed as a slush-type of beverage, the liquid portion having a predetermined level of carbonation and sweetness. The amount of sugar and the amount of carbonation in well-known soft drinks are closely controlled because they affect the ultimate taste of the beverage. Thus the public is conditioned subconsciously to expect a certain level of sweetness and a certain level of carbonation, and having such a beverage, members of the public are often able to identify the particular brand name associated therewith. In order to preserve product identity, it therefore becomes particularly important to maintain in the finished product such predetermined level of carbonation and sweetness. In this method, I provide a quantity of the sugar-containing beverage at room temperature, namely at an uncontrolled temperature which will vary depending upon the ambient. Such beverage deliberately has a degree of carbonation and a degree of sweetness which is below what the ultimate desired predetermined level shall be. This preliminary product is introduced in the system 10 in a product line 11 from a source of such product. In FIG. 1, such source is indicated as being a carbonator-blender 12. It is to be understood that in accordance with certain aspects of the present invention, such source could comprise conventional pre-mix transfer tanks containing such preliminary beverage.

The carbonator-blender 12 is provided with water, syrup, and carbon dioxide gas. In this embodiment, water passes through a filter 13 which preferably removes all particles having a size in excess of 2 microns. It is then transferred by means of a constant delivery pump 14 driven by a motor 15 to the carbonator-blender 12 via a check-valve 54 at a rate determined by a flow control valve 16 of a known adjustable type whenever a solenoid valve 17 in a transfer line 18 is energized. The valve 17 is controlled by a switch 19 which is responsive to the mass of product in the carbonator-blender 12. If desired, a relief valve 20 may be provided to protect the pump 14. Further, a pressure switch 21 is provided which is normally closed whenever there is a pressure present at the inlet to the water system, such pressure coming from the water mains.

Carbon dioxide gas is provided from a tank 22 having a conventional valve 23 leading to a pressure regulator 24 which delivers carbon dioxide gas to a syrup transfer tank 25 and to a secondary pressure regulator 26 of a known type which is self-bleeding (indicated by a vent line 55) and by which regulator the carbonator-blender 12 is also charged with carbon dioxide gas. The regulator valve 26 is typically set to deliver gas having a pressure in the range of 30 to 40 p.s.i where the desired carbonation in the carbonator should be between 2½ and 3 volumes of $CO_2$ gas per volume of water. This is the degree of carbonation referred to above which is below the desired ultimate predetermined level. In a typical installation, the range from 30 to 40 p.s.i. is derived from the preference in carbonation level for the ultimate drink, and therefore this range could be somewhat greater, such as from 20 to 45 p.s.i. The primary pressure regulator 24 is set at a higher level, for example at least 35 p.s.i. above the setting of the regulator 26. A pressure switch 27 is provided in the $CO_2$ line as a safety switch, much like the switch 21, to shut down the system in the absence of either of these ingredients.

The syrup is forced out of the tank 25 by carbon dioxide gas pressure and passes through an optional bypass valve 28, thence through a manually adjustable flow control valve 29, a check valve 30, a float switch 31, and a solenoid valve 32 and thence to the carbonator-blender 12 through an internal snifter valve 56. The snifter valve 56 is a check valve which passes gas in either direction but will not permit liquid flow in a reverse direction, and can be of known construction. The flow control valve 16 in the water line 18 could be set typically to permit flow at the rate of 1.5 ounces per second, irrespective of upstream pressure. If four parts of water are to be used for one part of syrup, then the flow control valve 29 would be set to deliver one-fourth of 1.5 ounces per minute. To know this ratio accurately, there is provided a sampling valve 33 which may be manually opened so that samples of syrup can be manually withdrawn into a graduate for a fixed period of time, thereby enabling proof of the exact setting of the adjustable flow control valve 29.

The check valve 30 prevents any possible backup of the diluted syrup that is in the carbonator-blender 12 past such point, thereby assuring against the possibility of there being diluted drinks. The float switch 31 insures presence of syrup at that point so that like the other ingredient-presence testing switches 21, 27, the system can be shut down and the problem indicated by a suitable warning light (not shown). The syrup solenoid valve 32 as well as the pump motor 15 are, like the water solenoid valve 17, under the control of the fill-control switch 19. The carbonator-blender 12 is suspended on a spring-loaded mechanism (not shown) but represented by a spring shown schematically at 34. The pump 14 typically delivers water at a pressure of 100 p.s.i., and because of the violent agitation that takes place inside the carbonator-blender 12, there is a good deal of foam present therein, thus making a weight-sensing system ideal for controlling the contents thereof.

The pressure determined by the secondary pressure-regulator 26 is not only maintained in the carbonator-blender 12 but is present in the outlet line 11, a precool plate 35, a line 36, and a freezing chamber 37. The freezing chamber 37 is provided with a relief valve 38 which may be manually operated as a bleed valve to enable complete filling of the chamber 37 with the product. As product is transferred from an ambient temperature zone in which the carbonator-blender 12 is disposed, it becomes cooled by the precool plate 35, the temperature of which is determined by a refrigeration system 39 which has a temperature control 40 which maintains the temperature of the precool plate 35 within the range of 33 to 40° F., and preferably within the range of 34 to 36° F. The sugar in the product serves as anti-freeze, but if there should be some type of failure as to the amount of sugar present, there would be a tendency for the precool plate to freeze up. Therefore, to guard against such condition, a safety control 41 is provided of a known type which will indicate the presence of ice or the possibility that ice might be present in the event that the temperature should go as low as 32° F. The precool plate 35 has an internal coil which connects the lines 11 and 36, the internal coil being of considerable length and of restricted bore size so that when the freezing chamber 37 is being filled or refilled, substantially all the pressure drop takes place across the precool plate 35. If the precool plate 35 is omitted, a corresponding restriction is produced by the internal bore size and/or length of the lines 11, 36. While the degree of carbonation remains constant up through the line 36, as the temperature of such product has been substantially reduced by the precool plate, it is no longer near the substantially equilibrium conditions that exist in the carbonator-blender 12, and therefore such drink is extremely stable. By stable is meant that there is no tendency for the carbonic acid to break up as gas and water during its handling.

The pressure in the freezing chamber 37 is thus applied hydrostatically from the carbonator-blender 12. The freezing chamber 37 is refrigerated by a refrigeration system 42 of high capacity, there being one such refrigeration system for each freezing chamber 37. The refrigeration system 42 is under the control of a switch 43 which is mechanically actuated by a viscosity sensing elements 44 which may be of a known type.

As ice begins to form in the freezing chamber 37, a continually-rotating beater-scraper 45 removes it from the interior walls of the freezing chamber, the beater-scraper being driven by a continually operating motor 46. If for any reason beater rotation should terminate, such termination is sensed by a centrifugal switch 47 which is connected in series with the switch 43 to shut down the refrigeration system 42. As the temperature of the product passes below approximately 39° F., it begins to expand, thus creating an increase in pressure on the downstream side of the pressure regulator 26 which, being of the self-bleeding type, vents $CO_2$ gas from the line 57 through its vent 55 when ever the pressure in the line 57 exceeds the valve's selected set-pressure by an amount in the range of two to seven p.s.i. The snifter valve 56 normally never closes, but if it did and the pressure went up, the valve 38 would provide the necessary relief protection. Prepared product is withdrawn from the chamber 37 by means of a valve 48 which is manually actuated in a manual system, or which is electrically actuated in the instance of an automatic or coin-operated system, such details being conventional. The valve 48 has an internally smooth construction and has an effective flow area which is greater than that of the inlets 11, 35, 36 to the chamber 37. As there is no gas pocket in the chamber 37 (due to bleeding off of gas by the relief-bleed valve 38), as soon as the valve 48 has opened to a degree where its flow area exceeds that of the inlet, the pressure in the chamber 37 immediately drops to approximately atmospheric, and product flow through the valve 48 is at the rate that unfrozen product enters the chamber 37. In closing the valve 48, the pressure within the chamber 37 is brought back hydrostatically to that pressure which is determined by the secondary pressure regulator 26.

A typical carbonation pressure to which the secondary regulator 26 would be set is 35 p.s.i. If the temperature inside the carbonator-blender 12 is 76° F., then according to known carbonation principles, the water can absorb 2.6 volumes of carbon dioxide gas and be at a stable equilibrium condition. Due to lowering of the temperature of the product by the cooling plate 35, about all the pressure that would be needed to maintain this equilibrium condition in the line 36 is about 8 p.s.i. But since there is in this example a hydrostatic pressure of 35 p.s.i. present, a condition of non-saturation is present because the saturation level or degree of carbonation would be about 5.2 volumes of carbon dioxide gas. Therefore, although a saturated product enters the cooling plate 35, the product is only half saturated as it leaves the plate 35, thereby producing great stability and resistance to break-out during handling and transfer to the chamber 37.

The sugar present in the syrup of the beverage serves as an antifreeze, and hence the syrup may be termed as a palatable freezing point depressant. With a typical beverage, such as one of the cola types, because of the presence of sugar no ice begins to form until the product reaches a temperature of about 28.5° F. As water is frozen out of the product in the freezing chamber 37, as pure ice, the sugar concentration increases in the remaining liquid phase, and thus the freezing point progressively decreases. By way of example, temperatures of 22° F. have been noted as being actual freezing temperatures with the chamber 37. Therefore, there is no true freezing point for the product, but rather a range of temperatures within which water will freeze out of the product. A temperature of 26° F. is a typical temperature encountered to have the proper degree of freeze-out.

Therefore, continuing with the same example, with a temperature of 26° F. and a pressure of 35 p.s.i. the liquid phase of the product is able to absorb about 6.5 volumes of $CO_2$ and be in equilibrium. Therefore, as freeze-out begins, not only is the sugar released from the portion that is freezing, but the $CO_2$ gas is given off under conditions which initially amount to less than ½ saturation, and any molecule of gas thus given off is quickly, within a few seconds, absorbed by the remaining liquid phase. This also raises the level of carbonation in that liquid phase. Therefore, in accordance with this invention, the amount of water frozen out is controlled so as to regulate the increase of the level of carbonation to a desired amount. Such desired amount will in all instances be to a level less than the saturation level of the liquid phase. The degree of freeze-out is readily sensed by the viscosity of the resulting slush by means of the viscosity sensing element 44.

With the refrigeration system 42 operating, $CO_2$ gas is continually being given off by the product that is freezing and is continually being absorbed by the remaining liquid phase. During one cycle of operation, a temperature variation of about 2° F. is expected, and before the refrigeration system 42 becomes re-energized, any free molecules of gas will have been reabsorbed. During the freezing portion of the cycle, the presence of such free molecules is detectable by a slightly cloudy appearance of the product which is present during cycling of the refrigeration system 42 a few seconds after it comes on. The cloudiness disappears a few seconds after the refrigeration system 42 stops operating. It appears to be likely that not all of such free molecules, which are completely dispersed throughout the product, have been reabsorbed by the time the refrigeration system 42 comes on, as opening of the dispensing valve 48 increases the degree of cloudiness slightly, and closing thereof almost instantly removes such cloudiness, without effect on viscosity.

Another interesting aspect of the operation is the fact that as such cycling continues for a considerable period of time, for example overnight, when the dispensing valve 48 is opened, a clear product does not cloud up, whereas during ordinary dispensing operations, the clear product does cloud up a slight amount. This evidence strongly suggests that the absorption of $CO_2$ gas continues even after the cloudiness has disappeared and thus a very stable product is produced.

Care must be taken to agitate the product an excessive amount by the scraper-beater 45, which is permitted to rotate continually, to avoid break-out of $CO_2$ gas. Any tendency for $CO_2$ gas to break out is overcome by the fact that the product is maintained at a temperature and pressure which produce a condition of non-saturation which is continually present except for a few moments during dispensing. During dispensing, if the product is truly stable due to long storage, on opening the dispensing valve 48, nothing appears to happen inside the chamber 37. This appears to be analogous to the removal of a bottle cap with nothing happening to the product. Such product is readily withdrawn as a "soupy" or very wet drink. On the other hand, if that product is agitated during withdrawal, dissolved $CO_2$ gas breaks out, to an extent determined by the amount of such agitation, and a foamy drink is produced. This appears to be analogous to the formation of foam in a glass when beer is poured into it, except that in this invention, the foam is dispersed throughout the product so that the product is completely homogeneous. Such foaminess is known as being "overrun," and depending upon a multiplicity of factors, one of the chief of which is the surface tension of the product, the permanence of the foam or foamy product will vary. Therefore, if desired, a conventional foaming agent can be added to the product to increase the amount of and the permanence of the foamy slush-ice.

The predetermined level of sweetness of the ultimate product is to some extent a matter of personal taste, but experience indicates that users prefer a slightly higher level of sweetness at the low temperatures at which drinks of the type are served rather than when the same drinks are served without slush therein. An increase in level of sweetness by a controlled amount is therefore also obtained by the method of this invention. The degree of sweetness in this art is usually referred to as Brix, which is a commercial index of sugar content for beverages, syrup, and the like, measured by commercially available devices. A Brix of 14 is typical in the carbonator-blender 12. The term "overrun" has been discussed above as being caused by expansion of the produce due to freezing, and due to break out of dissolved gas during dispensing. A warm cup would thus cause more overrun than a cold cup, and similarly a cup of high specific heat would cause more overrun than a cup having a low specific heat. Further, other factors being equal, overrun depends on the degree of carbonation which will differ deliberately for a cola-type of drink as compared to a fruit-base type of drink. Further, overrun is affected by the extend of agitation, for example, the degree of streamlining within the dispensing valve 48, and in some instances even the distance that the cup is held below such valve, the internal shape of the cup, and like.

When more than one product is to be dispensed, the syrup system, that portion of the carbon dioxide system which extends from the primary pressure regulator 24, the carbonator-blender 12, the refrigeration system 42, and the freezing chamber 37 with its dispensing valve 48 and motor 46 is preferably duplicated. However, FIG. 2 shows another mode of providing two products. In this embodiment, the freezing chamber 37 forms part of a system as already described, except that there is no flavoring in the syrup. The chamber 37 is connected to a plurality of dispensing valves 50, 51 of the mixing-valve type, both receiving product from the chamber 37 in the same manner as the dispensing valve 48. However, each of the valves 50, 51 is provided with a separate flavoring line 52, 53 leading to a source of concentrate or dilute concentrate which can be admixed through a system such as shown for syrup in FIG. 1. In this type of operation, it is expected that there would be about one part of flavoring for each 32 parts of slush which become continually admixed within the respective mixing valves 50, 51. It is believed that this type of system is more useful when a wet drink is desired, as any imperfection in mixing within the dispensing valves 50, 51 would be automatically overcome by the swirling around of the product ingredients within the cup into which the product is drawn.

When it is desired to empty the carbonator-blender 12, as for cleaning or change of flavor, the normal controls 31, 32 can be bypassed or overridden manually and the bypass valve 28 opened to thereby, by gas, purge out substantially all the contents of the carbonator-blender 12 without adversely affecting the nature of the beverage which is purged out.

Although various minor modifications might be suggested by those versed in the art, it should be understood that I wish to embody within the scope of the patent warranted herein all such embodiments as reasonably and properly come within the scope of my contribution to the art.

I claim as my invention:

1. A method of dispensing a sugar-containing beverage as a slush-type of beverage, the liquid portion having a predetermined level of carbonation and sweetness, comprising in combination:
   (a) providing an unfrozen quantity of the carbon-dioxide and sugar-containing beverage, the beverage having a degree of carbonation and sweetness below said predetermined level;
   (b) maintaining a pressure on said quantity such that said degree of carbonation is maintained substantially as a constant below said predetermined level;
   (c) transferring a portion of said quantity to a separate freezing chamber in response to said pressure such that said freezing chamber is full of said beverage with said pressure applied hydrostatically thereto;
   (d) lowering the temperature of said portion until a predetermined proportion of pure ice has been frozen therefrom, resulting in slush formation and in separation of sugar and carbon doxide gas from the portion becoming frozen and absorption thereof by the remaining liquid portion and hence an increase of said degree of carbonation and sweetness to said predetermined level in the liquid portion due to such freezing; and
   (e) withdrawing a prepared serving of said beverage from said freezing chamber as a slush for consumption.

2. A method according to claim 1, wherein said quantity is provided as a pre-mixed solution of water, carbon dioxide gas, and flavored syrup.

3. A method according to claim 1, wherein said quantity is provided by admixing water, carbon dioxide gas and flavored syrup in a separate mixing and storage chamber.

4. A method according to claim 1, wherein the step of transferring the portion and lowering its temperature are automatically repeated in response to said step of withdrawing a serving.

5. A method according to claim 1, wherein said predetermined proportion of pure ice is sensed as a selected viscosity of the slush to terminate said temperature lowering.

6. A method according to claim 1, wherein during said steps of transferring and withdrawing, the flow rate to said freezing chamber is restricted such that the pressure in said freezing chamber is substantially below said pressure which is maintained on said quantity for carbonation maintenance.

7. A method according to claim 6, wherein the step of transferring the portion and lowering its temperature are automatically repeated in response to said step of withdrawing a serving, and wherein said predetermined proportion of pure ice is sensed as a selected viscosity of the slush to terminate said temperature lowering.

8. A method according to claim 1, which further includes:
   (a) transferring said portion to a separate pre-cool zone before said transferring thereof to said freezing chamber; and
   (b) lowering the temperature of said portion while in said pre-cool zone to a temperature which is a few degrees above the freezing point of said portion.

9. A method according to claim 1, wherein the withdrawing step is performed after that carbon dioxide gas, which becomes separated by freezing, is substantially all reabsorbed by the remaining liquid portion, to produce a wet drink devoid of significant overrun and whose carbonation is relatively stable.

10. A method according to claim 9, wherein the beverage is deliberately agitated outside of said freezing chamber during the withdrawing to render said relatively stable carbonation thereof partially unstable, and hence cause small bubbles of $CO_2$ gas to break out, to produce a foamy drink having appreciable overrun.

11. A method according the claim 1, wherein the withdrawing step is performed after that carbon dioxide gas, which is separated by freezing, is only partially reabsorbed, leaving small bubbles of $CO_2$ gas suspended in the beverage which expand during withdrawing in the atmosphere to produce a foamy drink having appreciable overrun.

12. A method according to claim 1, wherein said quantity is provided as a solution of plain syrup, water and carbon dioxide gas, and including the step of admixing a flavored solution to the beverage after it is withdrawn from the freezing chamber.

13. A method of dispensing a beverage at a predetermined level of carbonation, comprising:
   (a) providing a supply of aqueous carbonated beverage at constant super-atmospheric pressure and at a fixed degree of carbonation below said predetermined level;
   (b) lowering the temperature of the beverage to form pure ice therein;
   (c) regulating the extent of temperature-lowering in response to the percentage of water that has been frozen out of the beverage to provide said predetermined level of carbonation in the unfrozen portion of the beverage; and
   (d) withdrawing beverage containing said percentage of ice for consumption.

14. A method according to claim 13, wherein said beverage contains a foaming agent.

15. Apparatus for dispensing a slush type of beverage, comprising:
   (a) a storage source of carbonated beverage arranged to be pressurized with carbon dioxide gas;
   (b) a freezing cylinder having a chamber for freezing a quantity of said beverage therein as a slush;
   (c) a valve arranged to bleed off any gas trapped in said cylinder;
   (d) a dispensing valve connected to said cylinder; and
   (e) flow restricting means connecting said source to said cylinder and having a greater restriction to beverage flow therethrough than that of said dispensing valve in its open position, said flow restricting means effecting hydrostatic transfer of the pressure in said storage source to said chamber when said dispensing valve is closed.

16. Apparatus according to claim 15, including:
   (a) a first refrigeration system acting on said cylinder and responsive to the nature of the beverage in said chamber; and
   (b) a second refrigeration system acting on at least a portion of said flow restricting means and responsive to its temperature.

17. Apparatus according to claim 16, wherein said portion comprises a pre-cool heat-exchange plate.

18. Apparatus according to claim 15, including:
(a) a scraper-beater mounted for rotation in said chamber;
(b) means for continually rotating said scraper-beater;
(c) a refrigeration system acting on said cylinder and responsive to the nature of the beverage in said chamber; and
(d) a centrifugal switch responsive to rotation of said scraper-beater and connected to shut down said refrigeration system in the absence of said rotation.

19. Apparatus according to claim 15, wherein said source of carbonated beverage comprises:
(a) a carbonator and storage device arranged to be connected to and pressurized by a source of pressurized carbon dioxide gas;
(b) a source of syrup connected to said carbonator and arranged to be connected to and pressurized by a source of gas pressure having a higher pressure than that of said carbonator; and
(c) a source of water connected to said carbonator and arranged to deliver water thereto at a higher pressure than that of said carbonator.

20. Apparatus according to claim 19, which includes control responsive to predetermined weights of said carbonator and connected to control said sources of syrup and water for adding beverage ingredients to said carbonator.

21. Apparatus according to claim 19, which includes:
(a) a control system for adding beverage ingredients to said carbonator; and
(b) means responsive to the absence of water, to the absence of syrup, and to the absence of pressurizing gas for disabling said control system in response to any of such absences.

22. Apparatus according to claim 19, which includes a bypass valve connected across said source of syrup for delivering only carbon dioxide gas to said carbonator to substantially empty it.

23. Apparatus according to claim 19, including:
(a) a refrigeration system acting on said cylinder and responsive to the nature of the beverage in said chamber; and
(b) means responsive to the absence of syrup for shutting down said refrigeration system.

24. Apparatus according to claim 15, including:
(a) a plurality of said dispensing valves manifolded to said chamber, each of said dispensing valves comprising a mixing valve; and
(b) a corresponding plurality of pressurized sources of flavoring respectively connected to said mixing valves for admixing a selected flavor to the slush-ice beverage being dispensed.

25. Apparatus for dispensing a slush type of beverage, comprising:
(a) a source of carbonated beverage;
(b) a pressure regulator of the bleed-off type arranged to be connected to a pressurized supply of carbon dioxide gas and connected to deliver such gas at a selected pressure to said source of beverage;
(c) a freezing cylinder having a chamber for freezing a quantity of said beverage therein as a slush;
(d) a valve arranged to bleed off any air trapped in said cylinder;
(e) a dispensing valve connected to said cylinder; and
(f) a line connecting said source of beverage to said cylinder and effecting hydrostatic transfer of the pressure in said source of beverage to said chamber when said dispensing valve is closed;
whereby expansion of the beverage in said freezing chamber due to freeze-out will raise the gas pressure in said source of beverage only by an amount above said selected pressure which is controlled by the bleed-off of said pressure regulator.

26. Apparatus according to claim 25 including a snifter-type of check valve between said source of carbonated beverage and said pressure regulator for preventing any possible reverse beverage flow through such check valve while permitting reverse gas flow.

27. A method according to claim 1, wherein the step of maintaining a pressure on said quantity includes the steps of:
(a) applying carbon dioxide gas to said quantity at a predetermined pressure; and
(b) relieving said gas to said predetermined pressure in response to any increase of said pressure as a consequence of the expansion of said portion due to its temperature being lowered.

28. A method according to claim 13, wherein the aqueous carbonated beverage includes a palatable freezing point depressant.

29. A method according to claim 3, wherein said admixing is carried out substantially at room temperature while under said pressure.

30. A method of dispensing a carbonated sugar-containing beverage as a slush-type beverage having a predetermined quantity of carbon dioxide and sugar, comprising in combination:
(a) providing a quantity of the carbonated sugar-containing beverage at room temperature, the beverage having the predetermined amount of carbon dioxide and sugar;
(b) maintaining a pressure on said quantity such that said level of carbonation is maintained substantially constant;
(c) transferring a portion of said quantity to a separate freezing chamber in response to said pressure such that said freezing chamber is full of said beverage with said pressure applied hydrostatically thereto;
(d) lowering the temperature of said chamber to form ice crystals thereon and scraping ice crystals therefrom, resulting a slush formation and in separation of sugar and carbon dioxide gas from the amount becoming frozen and resulting in absorbtion thereof by the remaining liquid phase such that the sugar and carbon dioxide in said remaining liquid phase of the portion is that which was provided as said predetermined amount in said quantity at room temperature; and
(e) withdrawing a prepared serving of said beverage from said freezing chamber as a slush for consumption.

31. A method according to claim 30, wherein said quantity of beverage is provided as a pre-mixed solution of water, carbon dioxide gas, and flavored syrup.

32. A method according to claim 30, wherein said quantity of beverage is provided by admixing water, carbon dioxide gas, and flavored syrup in a mixing and storage chamber substantially at room temperature while under said pressure.

References Cited

UNITED STATES PATENTS 3,044,878   7/1962   Knedlik _____ 99—79 X

ROBERT B. REEVES, Primary Examiner

H. S. LANE, Assistant Examiner

U.S. Cl. X.R.

99—28, 79; 222—129, 146

UNITED STATES PATENT OFFICE
CERTIFICATE OF CORRECTION

Patent No. 3,460,713          Dated August 12, 1969

Inventor(s) R. T. Cornelius

It is certified that error appears in the above-identified patent and that said Letters Patent are hereby corrected as shown below:

Col. 2, line 38, change "dispencing" to -- dispensing --;

Col. 4, line 37, change "elements" to -- element --;

Col. 6, line 6, after "taken" insert -- not --;

Col. 7, line 43, change "doxide" to -- dioxide --;

Col. 10, line 42, change "a" to -- in --.

SIGNED AND
SEALED
JUN 30 1970

(SEAL)
Attest:

Edward M. Fletcher, Jr.
Attesting Officer

WILLIAM E. SCHUYLER, JR.
Commissioner of Patents

FORM PO-1050 (10-69)          USCOMM-DC 60376-P69